July 9, 1940.   W. D. CORLETT   2,207,534
VALVE TAPPET AND INSERT
Filed Dec. 14, 1938
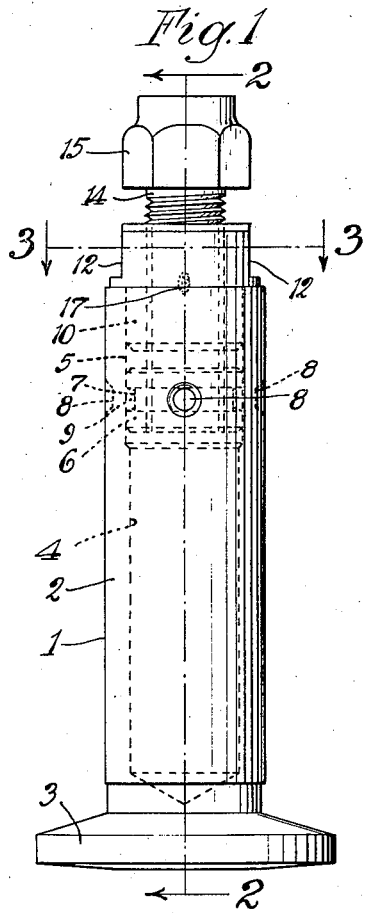
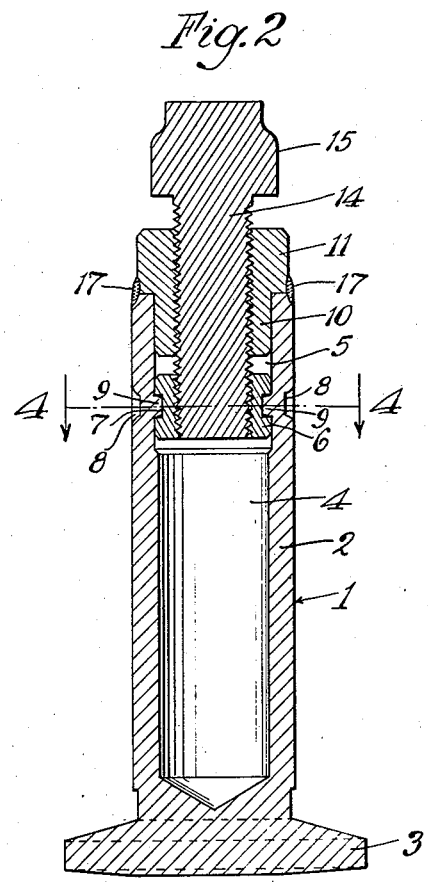
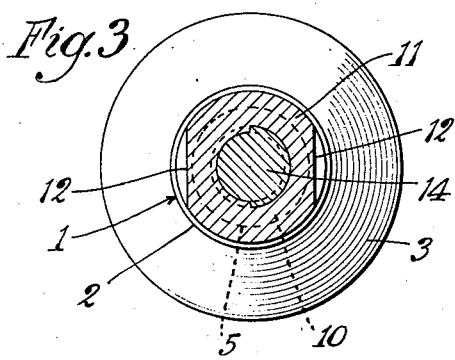
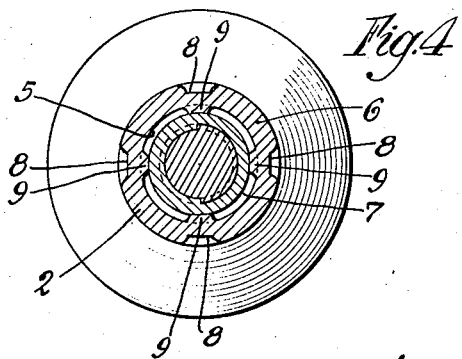
Inventor
Webster D. Corlett
by Parker & Carter
Attorneys.

Patented July 9, 1940

2,207,534

UNITED STATES PATENT OFFICE 2,207,534

VALVE TAPPET AND INSERT

Webster D. Corlett, Oak Park, Ill., assignor to Standard Screw Company, Hartford, Conn., a corporation of New Jersey Application December 14, 1938, Serial No. 245,619

8 Claims. (Cl. 123—90)

My invention relates to an improvement in valve tappet adjusting devices and has for one purpose the provision of a self-locking valve tappet adjusting screw in which the screw may be set to its desired position without the employment of any separate or external lock nut.

Another purpose is the provision of an adjusting device which has a constant torque when once assembled, and which will remain constant throughout the life of the tappet.

Another purpose is the provision of locking means in which the locking action is procured by a downward pull of the thread, which keeps the lower flanks of the thread on the tappet adjusting screw in contact with the upper flanks of the thread in the tappet, in the same direction as that of the blows of the cam.

Another purpose is the provision of combining with the locking action of means for fastening a tapped insert to the barrel of the tappet, thus eliminating welding, brazing or the like.

Other purposes will appear from time to time in the course of the specification and claims.

I illustrate my invention more or less diagrammatically in the accompanying drawing wherein:

Fig. 1 is a side elevation of my device;
Fig. 2 is a section on the line 2—2 of Fig. 1;
Fig. 3 is a section taken on line 3—3 of Fig. 1;
Fig. 4 is a section on the line 4—4 of Fig. 2.

Like parts are indicated by like characters throughout the specification and drawing.

Referring to the drawing, 1 generally indicates a one-piece or unitary valve tappet body having a barrel portion 2 of generally cylindrical shape and a mushroom head 3, herein shown as formed integrally therewith. The barrel 2 has a main bore portion 4 and an outer bore portion 5, herein shown as of slightly greater diameter. 6 represents a round tapped nut having an annular groove 7 thereabout.

In assembly the nut 6 is pressed into the bore 5 of the tappet in any suitable manner for a predetermined distance from the open end. It is then fixed at the desired position in any suitable manner by staking, spot-welding, brazing or the like.

I illustrate a plurality of staking marks or indentations 8. I may for example employ four spaced about the circumference of the barrel 2. The staking in effect presses four lugs 9 into the annular groove 7 of the nut 6, thus effectively preventing any longitudinal movement of the nut. The lugs 9 are slightly larger in diameter than the width of the annular groove 7, so that they are also effective to prevent any rotation of the nut. I illustrate this as a practical solution of the problem of fixing the nut 6 in place, but it will be understood that other securing means or methods may be employed.

10 indicates a tapped insert having a head portion 11 flattened as at 12. The insert 10 may be screwed on the tappet adjusting screw 14 with its head 15, and the screw 14 is then screwed into the nut 6. In this position the insert 10 has entered the reamed or enlarged bore 5 of the tappet cylinder 2. The tappet adjusting screw 14 may be screwed to its required overall length. When the longitudinal adjustment of the screw 14 in relation to the tappet is satisfactory, both the screw and the tappet body may be held stationary and the insert 10 with its head 11 may then be pulled up, creating a tension between the screw and the nut 6. This pulls the head 11 of the insert 10 down very tightly against the opposed end of the tappet body or cylinder 2.

The amount of pressure put at this stage determines the amount of torque or resistance to turning which the tappet adjusting screw 14 will thereafter have. It has been found that a torque of 35 inch pounds minimum is sufficient to keep the adjusting screw 14 from turning during the operation of an automobile motor.

When the insert 10 has been pulled up to the required tension it is fixed in position with relation to the tappet body or cylinder 2 by staking, arc welding, brazing or any other suitable means. I illustrate for example the employment of arc welding, the welded areas being illustrated as at 17. It will be understood that the purpose is merely to prevent relative rotation of the insert 10, 11 and the tappet body 2. The parts are locked against longitudinal movement by the adjusting screw 14, and the means of fastening need be only enough to prevent the above mentioned relative movement.

When the assembly above described is completed, there is a definite constant torque between the tappet body 2 and the insert 10, 11. This is maintained through the life of the tappet and does not change with adjustment. Fine adjustments are possible as no locking is required which would alter the accuracy of adjustment.

The tappet adjusting screw is made of any suitable material which is not indented by the action of the valve stem on its head. It is also of such material that it will not take a permanent set due to the tension put upon it by the action between the nut 6 and the insert 10. Concentricity between the tappet adjusting screw 14 and the barrel 2 of the tappet is not altered by the action of any lock nut. It is dependent only upon the accuracy of the tapping. The insert 10, 11 and the nut 6 are made of material which may be suitably treated to withstand the pounding to which the assembly as a whole is subjected in the course of its normal use in a motor.

One advantage of the above assembly is that it is possible to assemble the tappet 2, the nut 6, the insert 10, 11 and the screw 14 prior to the heat treating operation. After the initial assembly has been completed, and before applying the final tension, the tappet as a unit can be heat treated. During heat treating, scale is thereby kept out of the threads, and a fine fit is assured. After heat treatment, the proper required tension may be given to the insert 10 by rotating it in relation to the screw 14, and thereafter the securing means 17 or their equivalent may be applied and the device is then complete.

Many advantages of the above assembly and procedure will be apparent. The proper flanks of the threads of the screw are in contact with the opposed flanks of the tappet screw threads. The alinement of the parts is correct and accurate concentricity between the tappet 2 and the screw 14 is obtained, dependent only upon the accuracy of the tapping. Employment of any separate locking nut is avoided and the number of wrenches necessary for the adjusting operation is reduced. And finally, once the parts are set, the tappet assembly has a constant torque, which stays constant for the life of the tappet.

A variant form of my structure is described and claimed in a co-pending divisional application, Serial No. 270,505, filed on April 28, 1939.

It will be realized that whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

1. The method of forming a complete tappet assembly which includes inserting a tapped nut into the body of a valve tappet and fixing it therein in predetermined position; thereafter inserting an adjusting screw through a tapped insert and screwing the inner end of said screw into said nut, with a portion of said insert penetrating said body; thereafter heat treating the assembly thus formed; thereafter holding the tappet body and the adjusting screw against relative rotation and rotating the tapped insert and thereby creating a locking tension between the adjusting screw and the tapped members; and thereafter fixing the tapped insert against rotation in relation to the tappet body.

2. The method of forming a complete tappet assembly which includes inserting a tapped nut into the body of a valve tappet and fixing it therein in predetermined position; thereafter inserting an adjusting screw through a tapped insert and screwing the inner end of said screw into said nut, with a portion of said insert penetrating said body; thereafter holding the tappet body and the adjusting screw against relative rotation and rotating the tapped insert and thereby creating a locking tension between the adjusting screw and the tapped members; and therafter fixing the tapped insert against rotation in relation to the tappet body.

3. In an adjustable screw connection for tappets and the like, a hollow body, a plurality of screw threaded areas longitudinally and fixedly spaced in said body, a member initially rotatable in relation to said body, in which one of said screw threaded areas is included, an adjusting screw threaded through both said screw threaded areas, and means for holding said initially rotatable member fixed against rotation in relation to said tappet body after said member has been adjusted to stress the adjusting screw.

4. In an adjustable screw connection for tappets and the like, a hollow open-ended body, a nut in the hollow of said body, and means for holding it against axial movement or rotation in relation to said body, an adjusting screw threaded into said nut, and a tapped insert threaded on said screw, and including a portion penetrating the hollow of said body, and a portion opposed to the end of said body, the opposed faces of the insert and the interior of the body being smooth and generally cylindrical.

5. In an adjustable screw connection for tappets and the like, a hollow open-ended body, a nut in the hollow of said body, and means for holding it against axial movement or rotation in relation to said body, an adjusting screw threaded into said nut, and a tapped insert threaded on said screw, and including a portion penetrating the hollow of said body, and a portion opposed to the end of said body, the opposed faces of the insert and the interior of the body being smooth and generally cylindrical, said insert being initially freely rotatable in relation to said body, and means for securing it against rotation in relation to said body when a desired locking tension has been obtained in response to the rotation of said screw in relation to said nut.

6. In an adjustable screw connection for tappets and the like, a hollow open-ended body, a tapped element in the hollow of said body, a tapped member including a portion abutting against the open end of said hollow body, an adjusting screw penetrating both said tapped portions, the portions of the adjusting screw in contact with the threaded bores of the said two tapped portions being in stressed relation, said tapped member being initially free to rotate in relation to said hollow body, and means for positively securing said tapped member against rotation in relation to said body when a desired locking tension has been obtained in response to rotation of said screw in relation to the tapped element.

7. In an adjustable screw connection for tappets and the like, a hollow open-ended body, a tapped element located in the hollow of said body, a tapped member, including a portion extending into said body and initially freely rotatable in relation thereto and a portion opposed to the open end of said body, an adjusting screw penetrating the tapped element and the tapped member, the threads of the adjusting screw in engagement with the threads of said two members being in stressed relation when the said tappet member is in final adjusted position, and means for positively securing said tapped member against rotation in relation to said tappet body when the said tappet member has been rotated to final adjusted position.

8. In an adjustable screw connection for tappets and the like, a hollow open-ended body, a tapped element located in the hollow of said body, a tapped member including a portion abutting against the open end of the body, an adjusting screw penetrating said tapped element and member, the threads of the screw-threaded portions of said tapped element and tapped member being axially displaced from each other relative to the normal threading of the adjusting screw, and means for positively holding said tapped element against rotation in relation to said body, with the screw in locking tension.

WEBSTER D. CORLETT.